United States Patent
Carl et al.

(10) Patent No.: US 8,074,937 B2
(45) Date of Patent: Dec. 13, 2011

(54) METHOD FOR LOAD LIMITING IN DRIVE SYSTEMS FOR AIRCRAFT HIGH LIFT SYSTEMS

(75) Inventors: Udo Carl, Hamburg (DE); Uwe Neumann, Hösbach (DE); Ben Holert, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 661 days.

(21) Appl. No.: 10/579,420

(22) PCT Filed: Nov. 12, 2004

(86) PCT No.: PCT/EP2004/012861
§ 371 (c)(1),
(2), (4) Date: May 11, 2006

(87) PCT Pub. No.: WO2005/047108
PCT Pub. Date: May 26, 2005

(65) Prior Publication Data
US 2007/0080261 A1    Apr. 12, 2007

(30) Foreign Application Priority Data
Nov. 12, 2003    (DE) .................................. 103 53 672

(51) Int. Cl.
*B64C 13/16*    (2006.01)
(52) U.S. Cl. ........................................ 244/194; 244/213
(58) Field of Classification Search .................. 244/213, 244/215, 194, 75 R; 340/945
See application file for complete search history.

(56) References Cited

U.S. PATENT DOCUMENTS

| | | | | |
|---|---|---|---|---|
| 3,841,589 A | * | 10/1974 | Appleby et al. | 244/178 |
| 4,260,121 A | * | 4/1981 | Baston et al. | 244/213 |
| 4,904,999 A | * | 2/1990 | Klansnic et al. | 340/945 |
| 5,170,969 A | * | 12/1992 | Lin | 244/194 |

(Continued)

FOREIGN PATENT DOCUMENTS
EP    0922633    6/1999
(Continued)

OTHER PUBLICATIONS
Japanese Examination Report, dated Mar. 3, 2010, for corresponding Japanese Application No. 2006-538807 with English translation.

*Primary Examiner* — Joshua Michener
*Assistant Examiner* — Brian M O'Hara
(74) *Attorney, Agent, or Firm* — Intellectual Property Law Group LLP; Juneko Jackson

(57) ABSTRACT

The invention relates to a device for load limitation in a aircraft high lift system, said system comprising individual segments of landing flap systems and slat flap systems, and a drive unit. The inventive device for load limitation comprises a control unit that is connected to position sensors and is embodied in such a way as to process signals from the position sensors and to generate a signal for limiting the supplied drive power. The invention also relates to a method for load limitation. According to said method, signals from at least two position sensors are measured; at least one reference variable is calculated form the measured signals; each reference variable is compared with a corresponding threshold value pre-determined from a maximum authorized load; and a control signal is generated for limiting the drive power, when at least one of the reference variables reaches or exceeds the threshold value.

5 Claims, 4 Drawing Sheets

U.S. PATENT DOCUMENTS

| | | | |
|---|---|---|---|
| 5,598,991 A * | 2/1997 | Nadkarni et al. | 244/203 |
| 5,686,907 A * | 11/1997 | Bedell et al. | 340/945 |
| 5,719,566 A | 2/1998 | Readman et al. | |
| 6,299,108 B1 * | 10/2001 | Lindstrom et al. | 244/213 |
| 6,466,141 B1 * | 10/2002 | McKay et al. | 340/963 |
| 7,226,020 B2 * | 6/2007 | Pohl et al. | 244/213 |
| 7,354,022 B2 * | 4/2008 | Richter et al. | 244/194 |
| 7,549,605 B2 * | 6/2009 | Hanlon et al. | 244/75.1 |
| 2006/0060719 A1 * | 3/2006 | Hauber et al. | 244/194 |

FOREIGN PATENT DOCUMENTS

JP  2000514382  10/2000

* cited by examiner

METHOD FOR LOAD LIMITING IN DRIVE SYSTEMS FOR AIRCRAFT HIGH LIFT SYSTEMS

FIELD OF THE INVENTION

The invention relates to a method and an apparatus for load limiting in an aircraft high-lift system, with the aircraft high-lift system having a branching drive system for mechanical power transmission to drive stations of individual segments of landing flaps and/or leading-edge slat systems, position sensors and a drive unit.

BACKGROUND OF THE INVENTION

Aircraft high-lift systems are already known which have a central drive unit and a branching drive system for mechanical power transmission to the drive stations of individual segments of landing-flap/leading-edge slat systems. If a landing-flap segment and/or a transmission for the branching drive system were to become blocked, this segment and the corresponding branch of the drive system and/or the transmission and the corresponding branch of the drive system would have to absorb all of the drive energy from the drive unit as a reaction moment, and would have to be designed to be accordingly massive and heavy.

Mechanical load limiter devices (torque limiters) are provided as protection apparatuses in aircraft high-lift systems with a branching drive system such as these, in order to prevent local overloading in that segment and in the corresponding branch of the drive system and/or the transmission and the corresponding branch of the drive system in the event of blocking of the landing-flap segment and/or of a transmission in the branching drive system. In this case, the landing-flap segment is protected by the station load limiter (actuation torque limiter) and the branching drive system is protected by the system load limiter (system torque limiter).

On the basis of mechanical components, load limiter devices such as these in their own right represent a largely optimized solution. However, because of their complex design, these systems increase the mass and the operating costs of an aircraft equipped with them and, furthermore, by nature of their function they are activated only in the event of faults. Finally, with narrow design tolerances and with parametrically sensitive system dynamics, these load limiter devices can also respond when the drive system is intact and operating without faults or errors, then blocking the entire system.

SUMMARY OF THE INVENTION

The object of the invention is to provide a method of the type mentioned initially and an apparatus for carrying out a method such as this, which achieve load limiting with a desirable reduction in the mass and operating costs of the system.

The invention achieves the object by means of a method and an apparatus as claimed in the independent claims. In accordance with the method according to the invention, state characteristic variables are detected on components of the drive system, and are transmitted to a monitoring unit, for load limiting. This monitoring unit evaluates the state characteristic variables by means of an algorithm for fault identification, and initiates monitored limiting of the drive unit in the event of a fault. This method according to the invention means that it is possible to limit the fault-dependent overloads resulting from jamming in a high-lift system, without having to provide a mechanical load limiter device.

BRIEF DESCRIPTION OF THE DRAWINGS

The invention will be explained in more detail in the following text with reference to one exemplary embodiment, which is illustrated in the drawing, in which.

DETAILED DESCRIPTION OF SPECIFIC EMBODIMENTS

Figure 1:
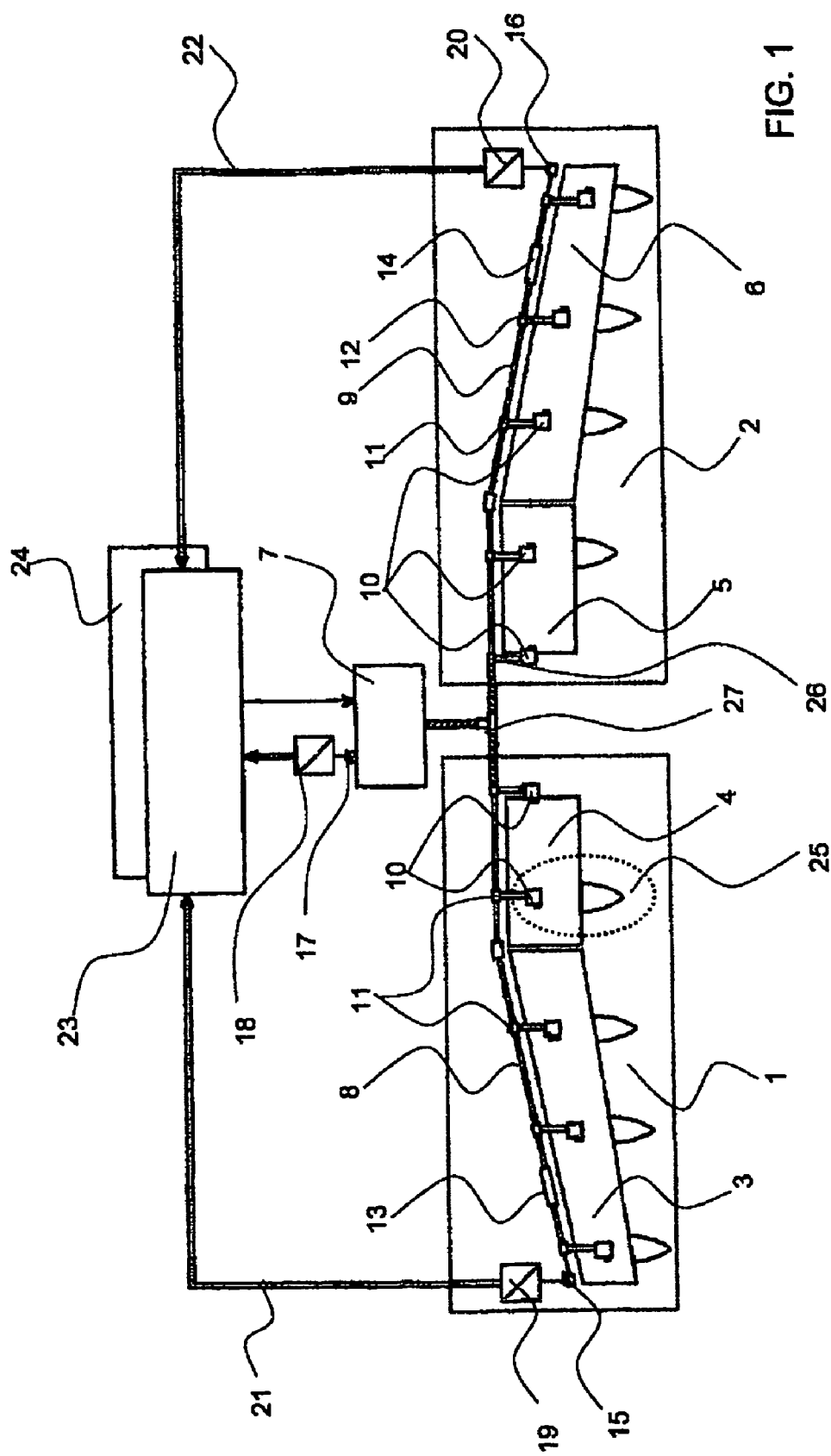
FIG. 1 shows the schematic design of a flap drive system according to the invention, with the associated drive components and electronically controlled overload protection, based on a comparison of signals.

The drive system as illustrated in FIG. 1 for landing flaps is equipped with electronically controlled overload protection rather than with a conventional mechanical load limiter. In this case, the drive system comprises a port and a starboard subsystem 1, 2, which are respectively used to drive two high-lift flaps 3, 4 and 5, 6 which are arranged on the trailing edges of the wing, with the two subsystems 1, 2 being designed to be symmetrical with respect to one another. The mechanical power which is required to position the flaps 3 to 6 is produced by a central drive unit 7 whose power can be controlled in a highly dynamic manner, and is in each case passed via a drive train 8, 9, respectively, to a series of mechanical actuators 10 in the two wings.

These in each case include branching transmissions, inter alia 11, 12. The individual drive stations 25 are connected to the drive train 8 by means of the respectively associated branching transmissions 11. Hydraulically operable brakes 13, 14 are also arranged in the outer end area of the drive trains 8, 9. Furthermore, asymmetry transmitters 15, 16 are located at the two outer ends of the respective drive trains 8, 9, that is to say an angle position transmitter by means of which the instantaneous angle position of the shaft at the end of each drive train 8, 9 can be determined and, if appropriate, any asymmetric position of the flaps can be identified from an asymmetric angle position. The arrangement is completed by an angle position transmitter 17 located at the drive unit 7, with the three last-mentioned components each being connected via a respectively associated transmitter unit 18 to 20 and corresponding signal lines 21, 22 to a special monitoring unit 23, which is equipped with a monitor in order to identify jamming.

Because of the symmetrical design of the drive system and of the flaps, the states of the two subsystems will differ only slightly from one another during normal flight, since the two subsystems for power transmission to the flaps on the port and starboard wings have a virtually identical dynamic response. One possible minor difference is caused essentially by an asymmetric air load distribution on the two wings, which can be taken into account analytically by means of adaptive threshold values in the course of the fault identification process, when the spoiler deflections and airspeed are known. In the event of jamming, in contrast, the mechanical characteristics of one of the two subsystems will change significantly, and thus also its dynamic response. If the stimulus by the drive unit 7 is identical, this leads to different states in these two subsystems. In this case, the sound subsystem also acts as a reference system for the faulty subsystem. A signal comparison between the states at the respective ends of the two drive trains and/or between other symmetric states of the port and starboard subsystems 1, 2 therefore leads in the case of jamming to differences which would not occur in the sound normal case and are used according to the invention for detection of jamming.

In order to preclude material failure, the drive unit 7 is now limited if predetermined threshold values for the state differences are exceeded as a result of jamming. In addition, a reduced load on the output drives is achieved in the case of jamming by means of predetermined flexibility of the elements, the shaft section 27, between the drive unit 7 and the first branching transmission 26, without having to reduce the dominance of jamming on the states of a subsystem. The evaluation of the signals which are required for fault identification in the event of jamming such as this and the initialization of monitored limiting of the central drive unit 7 are in this case carried out in the monitoring unit 23, which is itself a component of an actuation and monitor computer 24 for the high-lift flap system.

FIG. 1 thus shows an apparatus for load limiting in an aircraft high-lift system, with the aircraft high-lift system having a branching drive system for mechanical power transmission to drive stations 25 of individual segments 3, 4, 5, 6 of landing-flap and/or leading-edge slat systems, position sensors 8, 9, 17 and a drive unit 7, with the apparatus for load limiting having a monitoring unit 23 which is connected to the position sensors 8, 9, 17 and is designed to process signals from the position sensors 8, 9, 17 and to produce a signal in order to limit the drive power that is supplied.

The position sensors have an angle position transmitter 17 on the drive unit, and/or angle position transmitters 15, 16, which operate as asymmetry transmitters, at the ends of the drive trains 8, 9.

Figure 2:
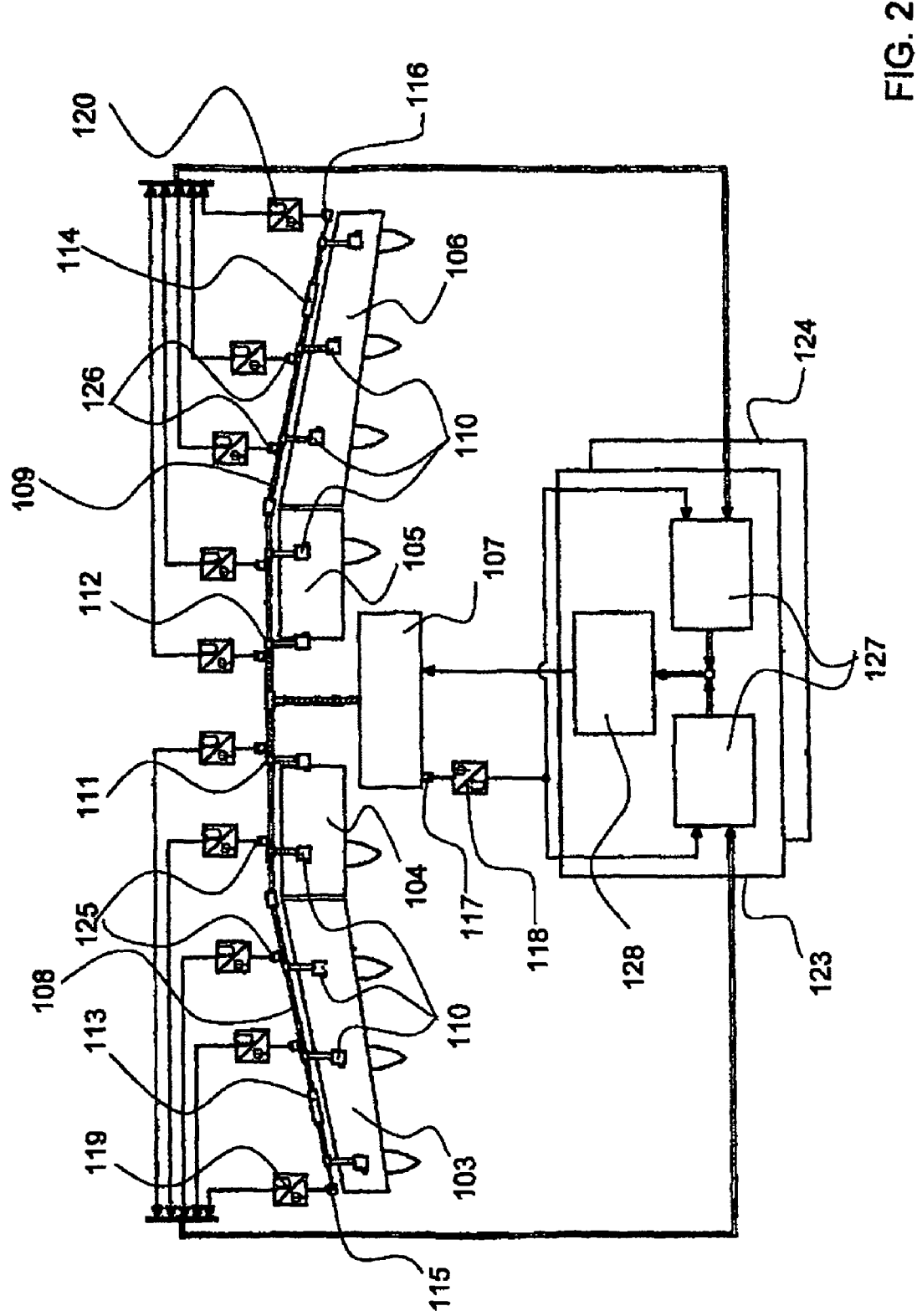
FIG. 2 shows the schematic design of a flap drive system according to the invention, in a further embodiment.

The flap drive system which is illustrated in FIG. 2 in the implementation of this method relates to electronically controlled overload protection by means of signal-based diagnosis. The drive system is designed to be largely identical to that illustrated in FIG. 1, and is used to drive two high-lift flaps 103, 104 and 105, 106, respectively, on the trailing edges of a wing via a central drive unit 107 and, via two drive trains 108, 109, branching transmissions 111, 112 as well as mechanical actuators 110. In this case as well, hydraulically operable brakes 113, 114 and asymmetry transmitters 115, 116 are located in the outer end area of the drive trains 108, 109. Furthermore, an angle position transmitter 117 is provided on the drive unit 107. In addition to the transmitter units 118 to 120 and corresponding signal lines, further signal transmitters 125, 126 (which are likewise connected to the monitoring unit 123) are, however, in this case provided on the drive trains 108, 109, in each case in the immediate vicinity of the branching transmissions 111, 112.

One particularly preferred embodiment of the invention uses signals from position sensors 17, 15, 16 from FIG. 1 and two further signals from position sensors in the immediate vicinity of the respective first branching transmissions of the port and starboard drive train, in order to limit the load in the drive train. This embodiment allows the system load limiter to be replaced.

Figure 3:
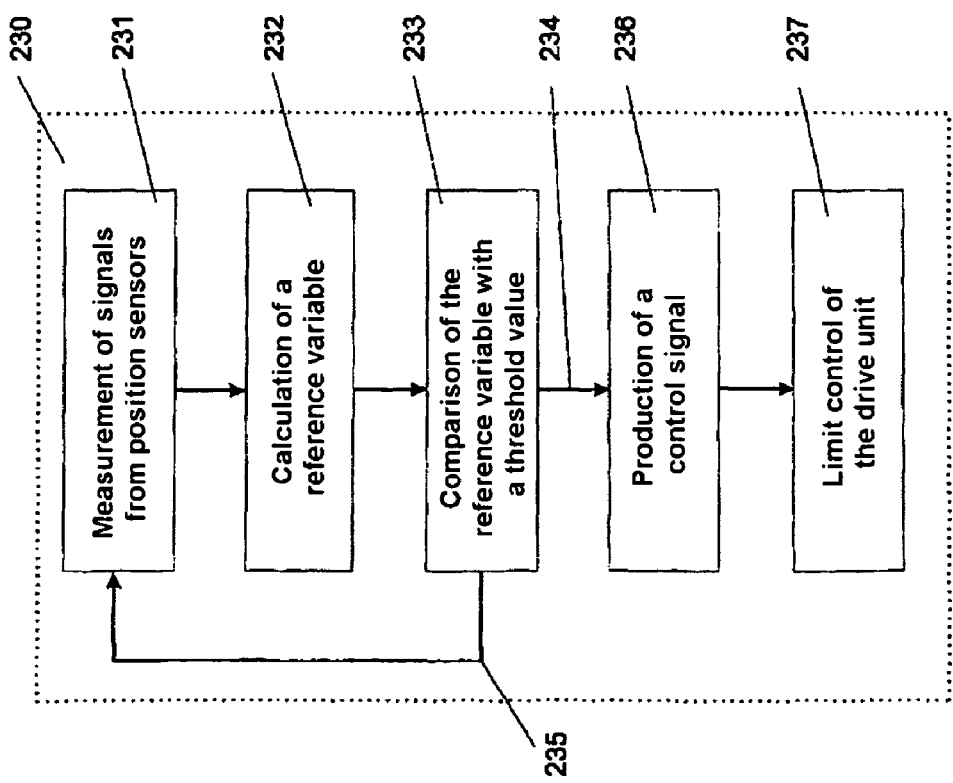
FIG. 3 shows a flowchart of one method for load limiting according to the invention.

FIG. 3 uses a flowchart 230 to describe a method according to the invention for load limiting in an aircraft high-lift system, with the aircraft high-lift system having a branching drive system for mechanical power transmission to drive stations of individual segments of landing-flap and/or leading-edge slat systems, position sensors and a drive unit.

Signals from at least two position sensors are measured in method step 231. These signals represent the angular positions at the positions of the position sensors in the drive train. A plurality of position sensors may also be used along the drive train. These signals are supplied to the monitoring unit 23 as shown in FIG. 1 or 123 as shown in FIG. 2, in which the next method steps are also carried out.

At least one reference variable is calculated from the measured signals from the position sensors in method step 232. The reference variable is the indicator for identification of jamming, and thus of overloading. The determination of the reference variable is described in the following text.

Each reference variable is compared with a corresponding threshold value, which is defined in advance from a maximum permissible load, in the next method step 233. Various reference variables may be defined, corresponding to identical or different threshold values.

Provided that none of the reference variables reaches or exceeds the corresponding threshold value, branching takes place as shown by the arrow 235 to the method step 231, and further measurements of signals from position sensors are carried out.

If at least one of the reference variables reaches or exceeds the corresponding threshold value, branching takes place as shown by the arrow 234 to the method step 236, to the production of a control signal for limiting the drive power in the monitoring unit 23 from FIG. 1 or 123 from FIG. 2.

The drive power of the drive unit is limited using the control signal in method step 237. In this case, the control signal which is produced by the monitoring unit is passed to the monitoring computer 24 shown in FIG. 1, or 124 in FIG. 4, which initiates monitored limiting of the power supply of the system by the drive unit. The drive system advantageously has a highly dynamic drive unit for rapid control of the drive power.

The measured signals from two position sensors can be used together with knowledge of the flexibility (reciprocal of the stiffness) of the drive train between the positions of the position sensors to calculate the load in this section. The load distribution throughout the entire drive train can be calculated corresponding to the number of positions of the position sensors in the drive train. Various reference variables and a corresponding threshold value can be defined on the basis of these relationships and the maximum load on the overall system in the sound state, which is predetermined by the design or can be determined.

Because the difference in the load in the drive train upstream of and downstream from a branching transmission represents a drive train load to be limited, one of the reference variables in one preferred embodiment includes at least one difference between measured signals from at least two position sensors.

In a further preferred embodiment, two signals are measured with a known time interval at at least one position sensor, in order to determine the angular velocity from this. The difference in the angular velocities between differently positioned position sensors is an indicator of abrupt deceleration of the angular velocity at one point in the drive train. In consequence, an appropriate reference variable, which is a function of the difference between angular velocities, in conjunction with a suitable threshold value, identifies hard jamming which would undoubtedly lead to overloading. Various reference variables and an appropriate threshold value can be defined on the basis of these relationships and the maximum rotation-speed difference in the sound state, which is predetermined by the design or can be determined.

One of the reference variables preferably includes a function of acceleration. The considerations which are required for definition of the reference variable and for determination of the associated threshold value are obtained in a manner which, to a person skilled in the art, is similar to that in the case of the angular velocity.

In a further preferred embodiment, one of the reference variables uses a calculated load with similar considerations as above.

In a further preferred embodiment, the drive power of the drive unit is determined in order to more accurately deduce the load distribution in the drive train.

In yet another preferred embodiment, a threshold value is predetermined appropriately for an operating state. This allows the least-possible load in the event of jamming to be taken into account in every operating state of the system.

In another preferred embodiment, one of the reference variables includes a function of a state variable, which is estimated by means of mathematical methods, from a group comprising position, velocity and load. A model-based system can thus allow quicker jamming identification, with the number of sensors being reduced at the same time.

Figure 4:
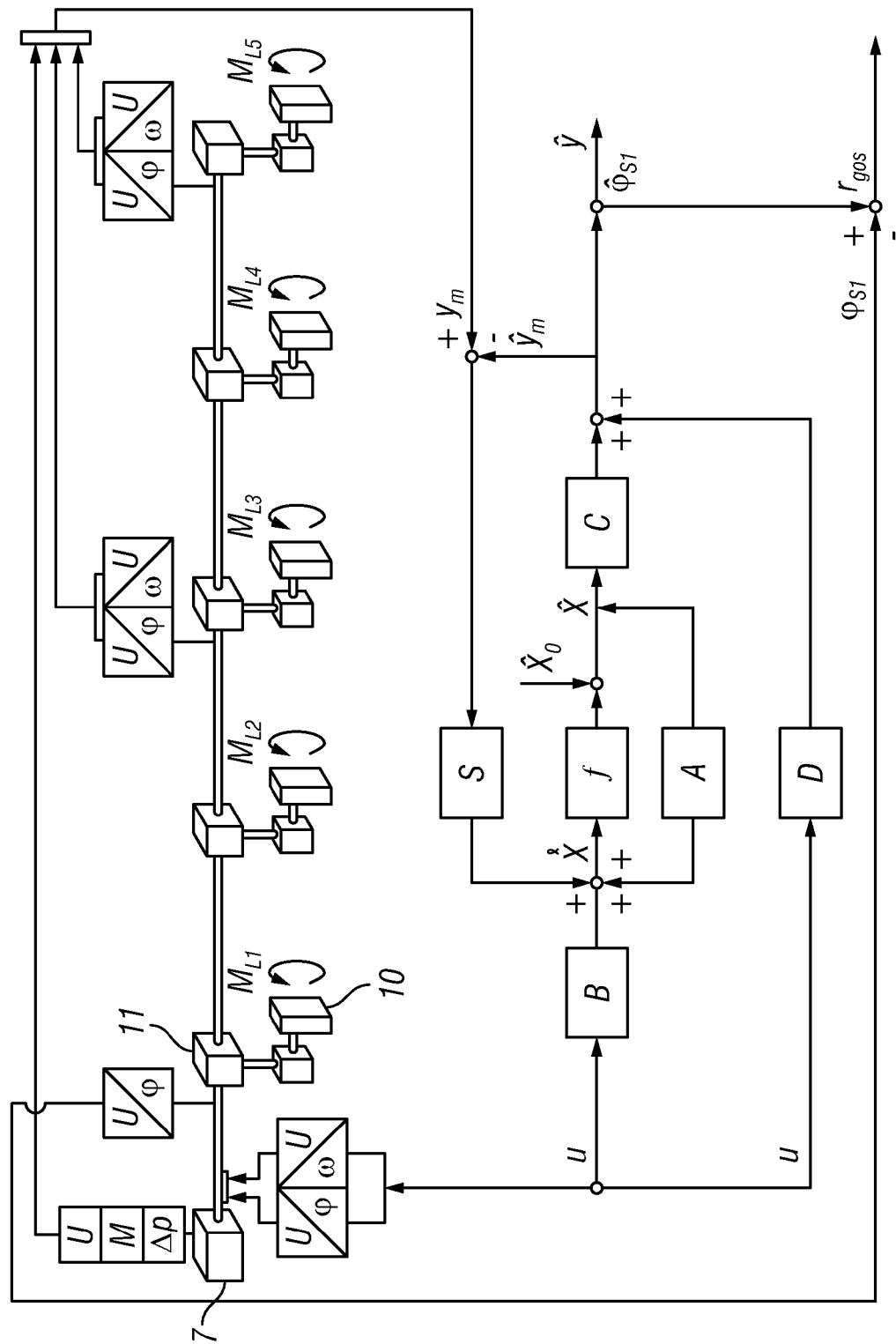
FIG. 4 shows an illustration of an outline of a so-called generalized observer for fault identification on a drive train.

FIG. 4 shows the implementation of one such model-based system, in particular illustrating both the sensor positions and the structural configuration of an observer. In addition to the input $$u = [\phi_{PCU} \omega_{PCU}]^T \qquad (1)$$

the difference between the measured output variable $$y_m = [\phi_{S3} \omega_{S3} \phi_{S5} M_{PCU}]^T \qquad (2)$$

and the output variable of the model is fed back as an additional input variable to the observer.

Investigations relating to state estimation using different sensor configurations have shown that this choice of the sensor arrangement can be regarded as the minimum with regard to sensors. The sensor system which is already implemented in present-day high-lift systems at the end of the shaft transmission and at the drive unit just has to have one sensor added to it, located centrally between these positions, in order to ensure the required quality of the observer.

An observer bank for identification of actuator faults is distinguished by all of the available inputs and outputs of the system in each case being used for operation of the observer, but with one individual defined input or output not being considered. The reference variable $$r_{gos} = \phi_{S1} - \hat{\phi}_{S1} \qquad (3)$$

is distinguished primarily by the lack of feedback of the position signal $\phi_{S1}$ to the observer. Because this value is mapped correctly by the observer in the sound state but not in the event of jamming, jamming results in a significant difference between the real position and the estimated position. The observer as shown in FIG. 4 can in consequence not correct the resultant state estimation error in the event of jamming. The threshold value is in this case chosen such that the reference variable is less than the threshold value in the sound state.

What is claimed is:

1. An apparatus for load limiting in an aircraft high-lift system, with the aircraft high-lift system having:

a branching drive system for mechanical power transmission to drive stations of individual segments of landing-flap and/or leading-edge slat systems via a drive unit, respective drive trains, and position sensors, wherein the position sensors have an angle position transmitter on the drive unit, and angle position transmitters, which operate as asymmetry transmitters, at the ends of the drive trains, wherein the apparatus has a monitoring unit for load limiting which is connected to the position sensors and is designed to process signals from the position sensors by measuring signals from at least two position sensors and calculating at least one reference variable from the measured signals, and, by comparison of the at least one reference variable which represents a load in the drive trains with a corresponding threshold value which is predetermined from a maximum permissible load, whereas the monitoring unit is provided to carry out a signal comparison between a respective subsystem in a port wing and a respective subsystem in a starboard wing and each subsystem comprises a drive train, an angle position transmitter which is located at the end of the drive train, and the angle position transmitter which is located on the drive unit, whereas the monitoring unit produces a control signal for monitored limiting of a power supply to the drive unit in the sense of limiting a drive power that is supplied, whereas the position sensors have angle position transmitters on branching transmissions of the drive trains, and whereas the monitoring unit is provided in order to calculate the at least one reference variable, which represents the load in the drive train from its signals.

2. The apparatus as claimed in claim 1, characterized in that position sensors which are located at each of the ends of the drive trains and an angle position transmitter which is located on the drive unit are provided, and in that the monitoring unit is provided in order to calculate the at least one reference variable, which represents the load in the drive train, from signals being delivered to the monitoring unit from the angle position transmitter located on the drive unit.

3. The apparatus as claimed in claim 1, characterized in that position sensors are additionally provided on branching transmissions of the drive trains, and their signals are used in order to calculate the at least one reference variable which represents the load in the drive train.

4. The apparatus as claimed in claim 1, characterized in that the power of the drive unit can be controlled in a highly dynamic manner.

5. The apparatus as claimed in claim 1, characterized in that a shaft section of defined high flexibility is arranged between the drive unit and the first branching transmission.

\* \* \* \* \*